United States Patent
Narayan et al.

(10) Patent No.: US 12,456,412 B2
(45) Date of Patent: Oct. 28, 2025

(54) SYSTEMS AND METHODS FOR AUTOMATICALLY ANALYZING AND MODIFYING DISPLAYED IMAGE CHARACTERISTICS OF A VIDEO DISPLAY SCREEN TO IMPROVE USER EYE ERGONOMICS

(71) Applicant: DELL PRODUCTS L.P., Round Rock, TX (US)

(72) Inventors: Devadiga Akshata Narayan, Bangalore (IN); Akshita Das, Gujrat (IN); Akash Lokesh, Bangalore (IN)

(73) Assignee: Dell Products, Round Rock, TX (US)

( * ) Notice: Subject to any disclaimer, the term of this patent is extended or adjusted under 35 U.S.C. 154(b) by 310 days.

(21) Appl. No.: 18/113,124

(22) Filed: Feb. 23, 2023

(65) Prior Publication Data
US 2024/0290245 A1    Aug. 29, 2024

(51) Int. Cl.
*G06T 7/70* (2017.01)
*G09G 3/20* (2006.01)

(52) U.S. Cl.
CPC ............. *G09G 3/2096* (2013.01); *G06T 7/70* (2017.01); *G06T 2207/30201* (2013.01); *G09G 2320/028* (2013.01); *G09G 2340/045* (2013.01); *G09G 2340/14* (2013.01); *G09G 2354/00* (2013.01)

(58) Field of Classification Search
None
See application file for complete search history.

(56) References Cited

U.S. PATENT DOCUMENTS

| | | |
|---|---|---|
| 9,195,815 B2 | 11/2015 | Choong et al. |
| 10,775,885 B2 | 9/2020 | Leland et al. |
| 10,937,425 B2 | 3/2021 | Summa et al. |
| 2015/0103003 A1* | 4/2015 | Kerr ............... G06F 3/0488 345/158 |

OTHER PUBLICATIONS

PC-Addicts, F.lux| Auto Monitor Color Changer| Time of Day| Save your Eyes, Feb. 13, 2011, (https://www.youtube.com/watch?v=-XeyHlcszQo). (Year: 2011).*
Microsoft, "Change Color Contrast In Windows", Obtained from Internet Jan. 15, 2023, 3 pgs.
Microsoft, "Set Your Display For Night Time In Windows" Obtained from Internet Jan. 15, 2023, 2 pgs.
Microsoft, "Zoom In Or Out Of A Document, Presentation, Or Worksheet", Obtained from Internet Jan. 19, 2023, 5 pgs.

* cited by examiner

*Primary Examiner* — Robert J Craddock
(74) *Attorney, Agent, or Firm* — Egan, Enders & Huston LLP.

(57) ABSTRACT

Systems and methods are provided that may be implemented to automatically and dynamically assess or analyze displayed image characteristics of a video display screen together with a current human user's eye ergonomics when viewing a video display screen, and then to automatically and dynamically adjust (e.g., alter or modify) the image characteristics displayed by the video display screen to correct or improve the current user's eye ergonomics and reduce or eliminate human user eye strain.

20 Claims, 5 Drawing Sheets

SYSTEMS AND METHODS FOR AUTOMATICALLY ANALYZING AND MODIFYING DISPLAYED IMAGE CHARACTERISTICS OF A VIDEO DISPLAY SCREEN TO IMPROVE USER EYE ERGONOMICS

FIELD

This invention relates generally to information handling systems and, more particularly, to displayed image characteristics of a video display screen of an information handling system.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Exposure time to video display screens has exponentially increased for all human computer users irrespective of age group. But the level of user awareness of the proper eye ergonomics for viewing a video display screen is low. Even when users are aware of proper screen-viewing eye ergonomics, they often continue to strain their eyes as a result of factors like using improper viewing distances from the video display screen, and by displaying font sizes on the video display screen that are small enough to cause eye strain.

While software applications currently exist that are designed to encourage users to modify their computer use behavior by taking a break away from excessive video display screen time, users can still strain their eyes during their regular video display screen time if they are not consciously following habits of using proper eye ergonomics when viewing the video display screen. Computer users can develop eye-related discomforts due to practicing improper eye ergonomics, and some users ignore facing the consequences. Consequently, eye-related problems among computer users are trending higher. Unfortunately, damage to a user's eyes can sometimes go unnoticed until the damage reaches a threshold that calls for medical attention.

Current solutions for addressing excess video display screen time by a user are human-driven and rely on the user to take manual action/s. Current solutions also rely on the user to take manual actions to manually self-adjust the video display screen visual contents to increase the user's viewing comfort. Examples of current solutions include anti-glare screens fitted by the user to the video display screen and user-worn anti-glare glasses. Other solutions include a user-selected video display screen "night light" mode to reduce user eye strain. Users may also depress certain keyboard keys or apply finger motions to a touchpad or touchscreen display to manually zoom-in and zoom-out visual content size on the video display screen as needed to improve viewing comfort.

SUMMARY

Disclosed herein are systems and methods that may be implemented to automatically and dynamically assess or analyze displayed image characteristics of a video display screen together with a current human user's eye ergonomics when viewing a video display screen, and then to automatically and dynamically adjust (e.g., alter or modify) the image characteristics displayed by the video display screen (without any conscious audit or participation by the human user) based on the displayed image characteristics and/or current human user's eye ergonomics to correct or improve the current user's eye ergonomics and to reduce or eliminate human user eye strain problems, e.g., in a manner to ensure proper user eye ergonomics and to protect the user's vision over the long term. Examples of video display screen image characteristics that may be so analyzed and/or altered or modified include, but are not limited to, size (e.g., zoom value percentage) of displayed visual contents (e.g., such as size of textual fonts or numeric fonts, size of icons, size of pictures, etc.), color scheme of displayed visual contents and/or overall image, etc. This is in contrast to currently available conventional techniques which do not automatically correct a user's eye ergonomics, but that instead rely on the user to manually self-adjust the size of the visual contents displayed on a video display screen to fit the user's comfort level.

In one exemplary embodiment, the disclosed systems and methods may be implemented on an information handling system using software or firmware logic executing that is based on an artificial intelligence-machine learning (AI-ML) model which may be initially trained with predefined visual content size training data (e.g., a training dataset) that is based on assumed optimum eye ergonomics for an average human user. During use, the AI-ML logic model may then monitor, collect and record visual content size selection made by a human user at regular intervals (e.g., such as user-made selections and adjustments of displayed visual content size together with corresponding viewing distance between the user and the video display device screen surface) during operation of the information handling system in the field. The AI-ML logic model may then use the recorded visual content size selection data for the human user to further build on the predefined eye ergonomic training data used for altering the image characteristics displayed by the video display screen, and to therefore improve eye ergonomics for a human user. In this embodiment, rather than using only a prefixed set of values, the AI-ML logic model of this exemplary embodiment may operate to understand and take into account the human user's eye comfort while also automatically correcting eye ergonomics for the conditions under which the human user views the display screen area.

In a further embodiment, the disclosed systems and methods may implement software of firmware logic to automatically and periodically evaluate eye ergonomics compliance by a human user based on differences between defined eye ergonomic checkpoints (e.g., predefined eye ergonomic training data) and user visual content selection data gathered in the field and that is built through a machine learning process that monitors visual content size selection and adjustments made by a human user.

In a further embodiment, the disclosed systems and methods may implement software of firmware logic to learn a usage pattern of human user visual content size selection made in the field, and to use this learned usage pattern to effectively and automatically alter/adjust the size of the visual content elements on a display screen in a way that is most comfortable for the human user.

In one embodiment, the disclosed systems and methods may be implemented using an image adjustment microservice that communicates with optical image processing hardware (e.g., a camera) and a distance sensor (e.g., a visible light sensor, an ultrasonic or infrared "IR" distance sensor that is configured to send signals to and receive returned signals from the face of a human user of an information handling system, etc.).

Examples of environments and conditions under which the disclosed systems and methods may be advantageously implemented to reduce eye strain include, but are not limited to, scenarios such as user display screen viewing habits during software coding, where a compiling user may switch between terminal or command prompts, or switch from the editor which may have changed in font size and color. In such cases, the user may move back and forth in due course and in short intervals, which may cause user eye strain. In this scenario, the disclosed systems and methods may be implemented to automatically and dynamically adjust displayed visual content size as the user moves back and forth in order to reduce or prevent user eye strain. In another scenario, a user may employ multiple display screen desktops for work-related tasks, in which case it is impossible to keep all display screen monitors at the same distance from the user's face, therefore leading to eye strain. In this scenario, the disclosed systems and methods may be implemented to automatically and dynamically adjust image characteristics displayed to the human user by each video display screen to reduce or prevent user eye strain.

In one respect, disclosed is a method including executing logic on at least one programmable integrated circuit of an information handling system to perform the following: determining a current viewing distance between a current human user and the display screen area of the video display device; and then adjusting a displayed image characteristic of an image displayed on the display screen area based on the determined current viewing distance between the current human user and the display screen area.

In another respect, disclosed herein is an information handling system, including: a video display device; a distance sensor; and at least one programmable integrated circuit coupled to the video display device and the distance sensor. The at least one programmable integrated circuit may be programmed to provide image display data signals to the video display device to display an image to a human user on a display screen area of a video display device. The at least one programmable integrated circuit may be further programmed to: determine a current viewing distance between the current human user and the display screen area of the video display device from viewing distance data received from the distance sensor, and then to provide the image display data signals to the video display device to adjust a displayed image characteristic of the image displayed on the display screen area based on the determined current viewing distance between the current human user and the display screen area.

DESCRIPTION OF ILLUSTRATIVE EMBODIMENTS

Figure 1:
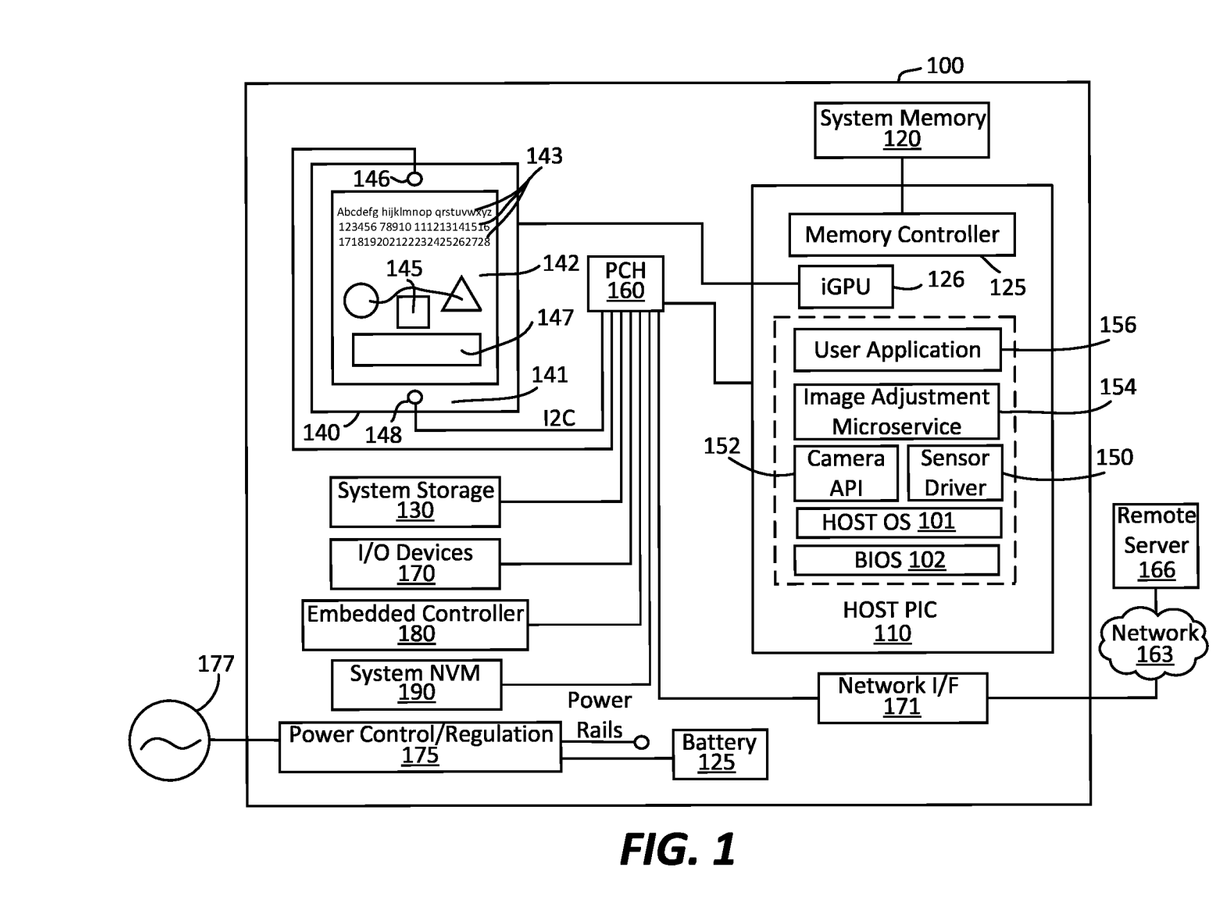
FIG. 1 illustrates an information handling system and network architecture according to one exemplary embodiment of the disclosed systems and methods.

FIG. 1 is a block diagram of an information handling system 100 (e.g., a desktop or all-in-one computer, computer server, laptop or notebook computer, tablet or convertible computer, etc.) as it may be optionally coupled in a network architecture via a network 163 (e.g., Internet or corporate intranet, etc.) to at least one other information handling system 166 (e.g., such as a remote computer server) according to one embodiment of the disclosed systems and methods. In this regard, it should be understood that the configuration of FIG. 1 is exemplary only, and that the disclosed methods may be implemented on other types and/or configuration of information handling systems. It should be further understood that while certain devices and components of an information handling system are shown in FIG. 1 for illustrating embodiments of the disclosed systems and methods, the information handling system is not restricted to including only those devices and components shown in FIG. 1 and described below.

In FIG. 1, information handling system 100 is being operated by a human user and may include a host programmable integrated circuit 110 that executes a host operating system (OS) 101 (e.g., such as Microsoft Windows 10 OS, Linux OS, iOS, etc.) and unified extensible firmware interface BIOS 102 (e.g., unified extensible firmware interface BIOS) for system 100, and at least one user application 156 (e.g., such as word processing application, spreadsheet application, Internet browser application, photo editing application, code editing application, graphics application or other software application). Also shown executing on host programmable integrated circuit 110 with host OS 101 is other logic including distance sensor driver 150, camera application programming interface (API) 152, and image adjustment microservice 154. In this embodiment, host OS 101, distance sensor driver 150, camera application programming interface (API) 152, image adjustment microservice 154 communicate with each other during runtime of host OS 101 on information handling system 100. In one embodiment, image adjustment microservice 154 may run on the kernel independent from host OS 101.

Still referring to the embodiment of FIG. 1, host programmable integrated circuit 110 may include any type of processing device, such as an Intel central processing unit (CPU), an Advanced Micro Devices (AMD) CPU or another programmable integrated circuit. An integrated memory controller 125 also executes within host programmable integrated circuit 110 to manage reads and writes to volatile system memory 120 (e.g., dynamic random access memory "DRAM", synchronous dynamic random-access memory "SDRAM", etc.) that is coupled as shown to host programmable integrated circuit 110.

As shown in FIG. 1, host programmable integrated circuit 110 may be coupled to an external or internal (integrated) video display device 140 (e.g., LCD, LED, or OLED display or other suitable video display device) depending on the particular configuration of information handling system 100. As shown, display device 140 includes an active display screen area 142 that is surrounded by an inactive (non-display) bezel area 141. In one embodiment, video display device 140 may be optionally integrated into one touchscreen component that is configured to display image/s to a human user and to receive user input from the human user.

In the illustrated embodiment, integrated graphics capability (e.g., using integrated graphics processing unit iGPU 126) may be implemented by host programmable integrated circuit 110 to provide image display data signals to video display device 140 to display image/s that include visual content to a human user on the display screen area 142 of video display device 140. Examples of such displayed visual content include, but are not limited to a background image (e.g., in this embodiment displayed co-extensive with display screen area 142) that is overlain by other visual content such as text or numeric characters 143, icons 145, dynamic visual content 147 such as movies or video clips, etc.) that each may be displayed to a system user by a given user application/s 156. In other embodiments, a separate programmable integrated circuit (e.g., such as graphics processor unit "GPU") may be coupled between host programmable integrated circuit 110 and video display device 140 to provide similar graphics and display capability for information handling system 100.

In one embodiment of FIG. 1, each of visual content 143, 145 and 147 may be displayed with a content size (e.g., text size, graphic image size, etc.) that corresponds to a given zoom value percentage (%) that is applied to all current visual content displayed by a corresponding given user application 156 (e.g., in a window or in full-screen mode) over the background displayed on display screen area 142 of video display device 140. In the practice of the disclosed systems and methods, the content size of the visual content displayed by a given current user application 156 on the display screen area 142 of video display device 140 may be simultaneously and proportionally varied in both X and Y axis directions by increasing or decreasing the zoom value % applied to the visual content by the given current user application 156, e.g., the content size of given visual content displayed with a zoom value % of 50% by a given current user application 156 may be increased by changing the zoom value % applied to the given visual content by the given current user application 156 to 100%, and the content size of given visual content displayed with a zoom value % of 150% by a given current user application 156 may be decreased by changing the zoom value % applied to the given visual content by the given current user application 156 to 80%. Although described in relation to zoom percentage values, it will be understood that visual content size may be expressed and controlled using any other suitable technique for proportionally varying the relative size of visual content.

In the embodiment of FIG. 1, a platform controller hub (PCH) 160 is coupled to control certain data paths and manage information flow between devices and components of the information handling system 100. As such, PCH 160 may include one or more integrated controllers/microcontrollers and/or interfaces for controlling the data paths connecting PCH 160 with host programmable integrated circuit 110 and other components of information handling system 100. In one embodiment, PCH 160 may include a Serial Peripheral Interface (SPI) controller and an Enhanced Serial Peripheral Interface (eSPI) controller. In some embodiments, PCH 160 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

In the embodiment of FIG. 1, components coupled by PCH 160 to host programmable integrated circuit 110 include system storage 130 (e.g., one or more media drives, such as hard disk drives, optical drives, NVRAM, Flash memory, solid state drives "SSDs", and/or any other suitable form of internal or external storage), external and/or integrated input/output (I/O) devices 170 (e.g., such as one or more of touchpad, keyboard, mouse, touchscreen of video display device 140 and associated controllers thereof) forming at least a part of a user interface for the information handling system. In the embodiment of FIG. 1, I/O devices 170 may also be coupled as shown to PCH 160 of system 100 to provide user input data to the host programmable integrated circuit 110 to enable a human user to input data and interact with information handling system 100, and to interact with host OS 101, user application program/s 156 and/or other software/firmware executing thereon.

Also coupled by PCH 160 to host programmable integrated circuit 110 are integrated camera 146 (e.g., front facing camera) for optical image processing, and integrated distance sensor 148 (e.g., a visible light sensor, an ultrasonic or infrared "IR" distance sensor configured to send signals to a user's face and receive returned signals from the user's face, etc.), which in this embodiment are each mechanically coupled to the bezel area 141 in a position so as to at least partially view and/or sense presence of a face of a human user that is positioned relative to video display device 140 while viewing an image displayed on display screen area 142 of video display device 140. As described further herein, camera 146 may be optionally configured in one exemplary embodiment to operate with camera API 152 to detect the presence, and direction faced by, a human user face that is in front of video display device 140. Distance sensor 148 may be configured to operate with distance sensor driver 150 to determine a current viewing distance (d) between the closest (e.g., front) surface 308 of the face of the human user 310 and the outer (front) surface 149 of the display screen area 142 of video display device 140. It is noted that ultrasonic or infrared "IR" distance sensors are capable of measuring distance to the surface 308 of a human user's face under relatively low (dim or dark) lighting conditions of the human user's face under which a camera and/or visible light distance sensor may not be capable of sensing the surface of the human user's face.

Also shown in FIG. 1 are other components of system 100 coupled to PCH 160 that may include network interface (I/F) device 171, system NVM 190 (e.g., serial peripheral interface (SPI) Flash memory) which stores firmware images and other code for operation of system 100, and embedded controller (EC) 180 that may be configured with a microcontroller or other programmable integrated circuit to perform functions such as power/thermal system management and to execute program instructions to boot information handling system 100, etc.

A power source for the endpoint information handling system 100 may be provided via an external power source 177 (e.g., mains power) and an internal power supply controller and regulation circuitry 175, and/or by an internal power source, such as a battery 125. In one embodiment, internal power supply controller and regulation circuitry 175 may be coupled to provide operating voltages on one or more power rails to one or more power-consuming components of information handling system 100, as well as to perform other power-related administrative tasks of the information handling system.

Figure 2:
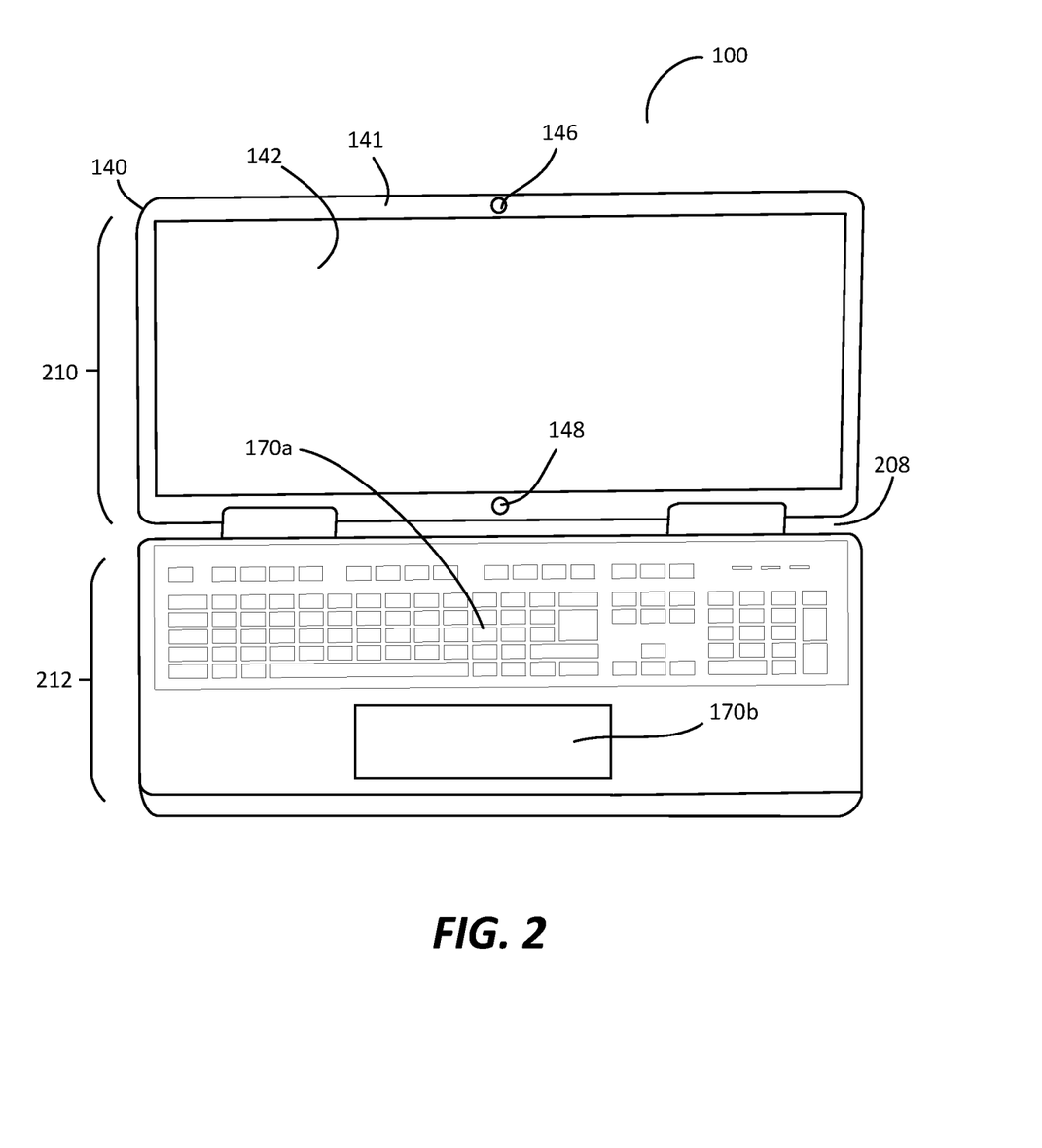
FIG. 2 illustrates a frontal perspective view of an information handling system according to one exemplary embodiment of the disclosed systems and methods.

FIG. 2 illustrates a frontal perspective view of an information handling system 100 configured as a notebook computer that includes a base component 212 that is hingeably coupled to a lid component 210 that supports video display device 140. In this embodiment, base component 212 may be an enclosed plastic and/or metal chassis that supports or contains (i.e., houses) a portion of the system components of FIG. 1 that are not supported or contained by lid component 210. Examples of system components supported by or contained within base component 212 include, but are not limited to, upward-facing keyboard I/O device 170a and touchpad I/O device 170b, host programmable integrated circuit 100, volatile memory 120 and non-volatile memory 190, internal battery 125, internal power supply controller and regulation circuitry 175, etc.

As shown in FIG. 2, lid component 210 supports video display device 140, camera 146 and distance sensor 148. In FIG. 2, lid component 210 of notebook information handling system 100 is opened about hinge line 208 relative to base component 212 (e.g., by about 90 to 120 degrees) such that display screen area 142, camera 146 and distance sensor 148 of video display device 140 each face frontward toward a human user that is viewing visual content of an image displayed in a frontward direction on display screen area 142 (e.g., such as visual content 143, 145, and/or 147 illustrated and described in relation to FIG. 1). Although a notebook computer information handling system 100 is illustrated in FIG. 2, it will be understood that the disclosed systems and methods may be implemented for video display devices 140 of other types of information handling systems 100, e.g., including a separate stand-alone monitor device supporting a video display device 140 that is coupled to a desktop or tower computer information handling system 100, or an all-in-one computer information handling system 100 that includes an integrated video display device 140.

Although in FIG. 2 camera 146 is shown mounted in a horizontally-centered position at the top of lid component 210 (e.g., within bezel area 141 of video display device 140) and distance sensor 148 is shown mounted in a horizontally-centered position at the bottom of lid component 210 (e.g., within bezel area 141 of video display device 140), it will be understood that either of camera 146 and/or distance sensor 148 may be mounted in any other position on lid component 210 and/or base component 212 that is suitable for use in the practice of the disclosed systems and methods as further described herein. For example, the positions of camera 146 and distance sensor 148 may be reversed, camera 146 and distance sensor 148 may be positioned adjacent to each other (e.g., at the top of lid component 210 or at the bottom of lid component 210), either of camera 146 and distance sensor 148 may be mounted in an off-centered position on lid component 210, etc.

Figure 3:
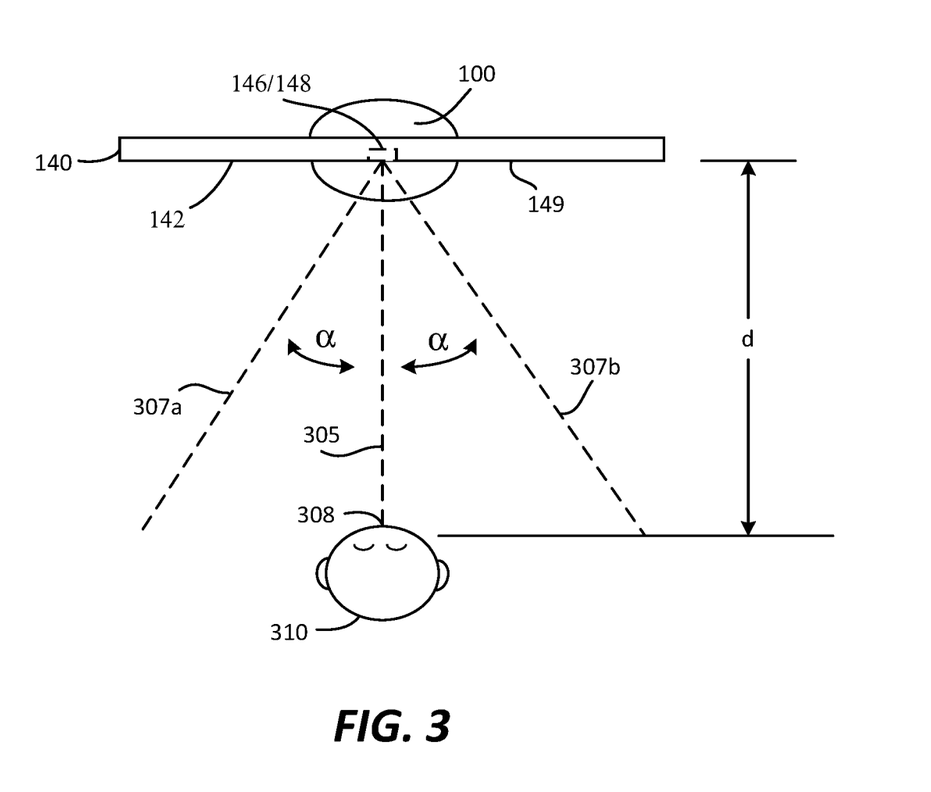
FIG. 3 illustrates an overhead view of a human user that is viewing visual content according to one exemplary embodiment of the disclosed systems and methods.

FIG. 3 illustrates an overhead view of a human user 310 that is viewing visual content (e.g., such as visual content 143, 145, and/or 147 illustrated and described in relation to FIG. 1) of an image displayed on display screen area 142 of a video display device 140 of a separate stand-alone monitor device or an all-in-one computer information handling system 100 that includes an integrated video display device 140. In FIG. 3, the center of the face of a human user 310 is positioned directly in front of video display device 140 so that the human user 310 is viewing a displayed image on display screen area 142 at a viewing angle (a) of 0 degrees to a centerline 305 of video display device 140. Also in FIG. 3, the closest surface 308 (e.g., in this case the horizontal center) of the front of the face of the human user 310 is positioned at a viewing distance (d) of 50 to 60 centimeters from the frontward-facing distance sensor 148 that may be positioned (e.g., mounted) in the bezel area 141 in a position that is flush with the outer (front) surface 149 of the display screen area 142 of video display device 140 such that a distance measured from distance sensor 148 to the closest surface 308 of the front of the face of the human user 310 is equal to the distance between the closest surface 308 of the front of the face of the human user 310 and the front surface 149 of the display screen area 142.

Although in FIG. 3 human user 310 is shown viewing a displayed image with visual content (e.g., visual content 143, 145, and/or 147) on display screen area 142 at a viewing angle (a) of 0 degrees to centerline 305 of video display device 140, it will be understood that in other embodiments a human user 310 may alternatively view a displayed image on display screen area 142 at a viewing angle (a) that is other than 0 degrees to the centerline 305 of video display device 140. This is illustrated in FIG. 3 where example leftward 45 degree alternative leftward viewing angle (a) 307a and an example alternative rightward 45 degree viewing angle (a) 307b are shown by dashed lines, it being understood that a viewing angle (a) may be greater than 45 degrees leftward or rightward of centerline of video display device 140, or may be a viewing angle (a) that is between 0 degrees and 45 degrees to the left or right of centerline 305 of video display device 140. Further, in other embodiments the closest surface 308 of the face of the human user 310 may be alternatively positioned at a viewing distance (d) of less than 50 centimeters or greater than 60 centimeters from the front surface of the front facing distance sensor 148.

Figure 4:
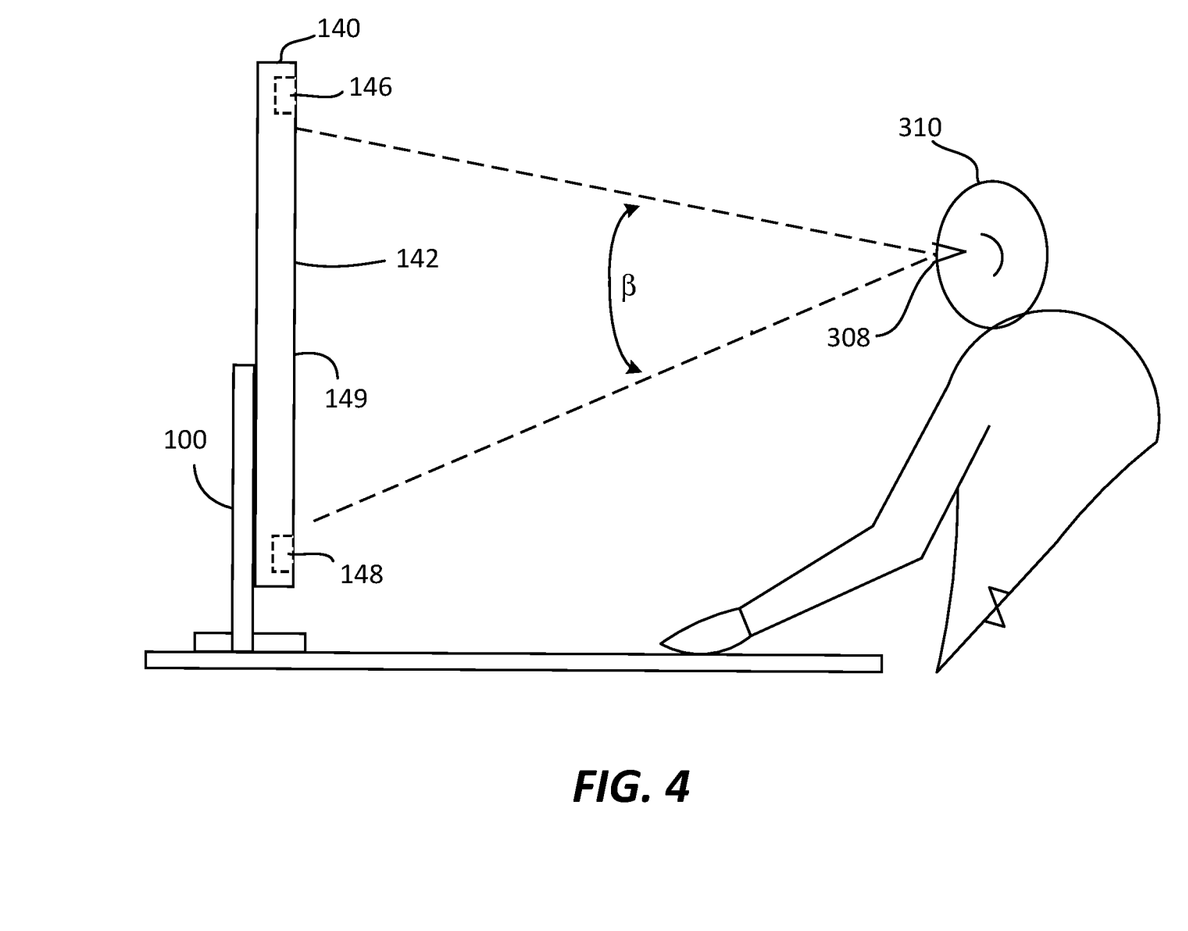
FIG. 4 illustrates a partial side view of a human user that is viewing visual content according to one exemplary embodiment of the disclosed systems and methods.

FIG. 4 illustrates a partial side view of the human user 310 of FIG. 3 that is viewing visual content (e.g., visual content 143, 145, and/or 147) of the image displayed on display screen area 142 of the video display device 140 of the information handling system 100 of FIG. 3. As shown in the exemplary embodiment of FIG. 4, in this position of human user 310 relative to video display device 140, the vertical distance between the top and bottom of display screen area 142 of video display device 140 presents to the eyes of human user 310 a vertical image angle ($\beta$) (e.g., of from 40 degrees to 45 degrees, 40 degrees, 45 degrees, etc.) between the top and the bottom of an image displayed on display screen area 142. However, it will be understood that in other embodiments a video display device 140 may present a vertical image angle ($\beta$) of less than 40 degrees or greater than 45 degrees to the eyes of human user 310.

Figure 5:
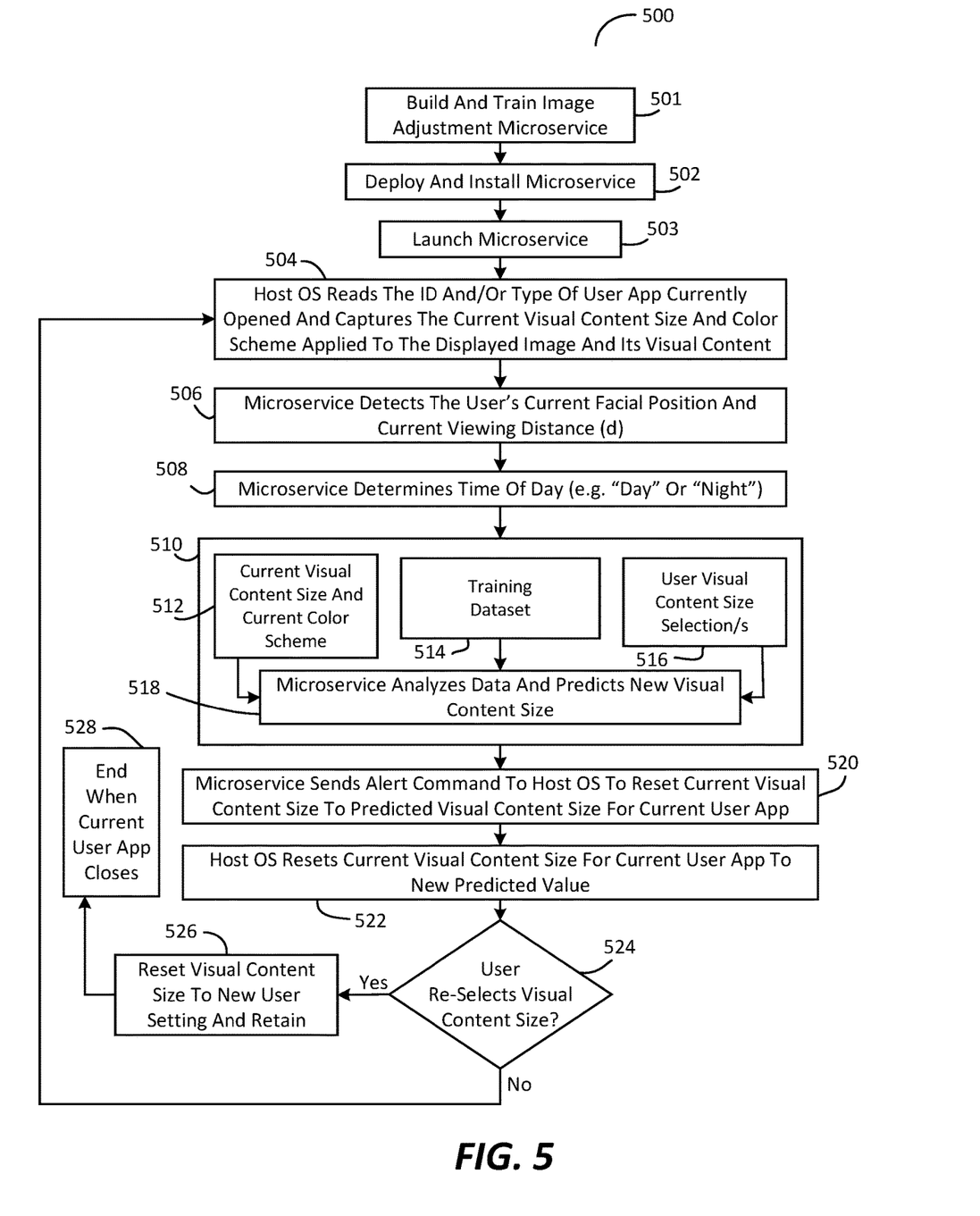
FIG. 5 illustrates a block flow according to one exemplary embodiment of the disclosed systems and methods.

FIG. 5 illustrates one exemplary embodiment of a block flow 500 that may be implemented according to one exemplary embodiment of the disclosed systems and methods. As shown, block flow 500 begins in block 501 where image adjustment microservice 154 is built and initially trained using a set of initial training data. In one exemplary embodiment of block 501, image adjustment microservice 154 may be built (or coded) using an artificial intelligence machine learning (AI-ML) logic (e.g., such as using decision tree or other suitable AI-ML logic model). In such an embodiment, the AI-ML logic may be initially trained using a predefined dataset of initial training data, a hypothetical example embodiment of which is shown below in Table 1. In Table 1, the number of viewing distances and the particular values displayed in Table 1 are exemplary only, and may vary as desired or needed to fit a given implementation.

TABLE 1

| Sensor-Measured Viewing Distance (d) | Initial Image Content Zoom Value (%) |
|---|---|
| 0.3 meter (1 foot) | 50% |
| 0.4 meter (1.131 feet) | 66% |
| 0.5 meter (1.65 feet) | 83% |
| 0.6 meter 2 feet) | 100% |
| 1 meter (3.3 feet) | 165% |
| 1.5 meter (5 feet) | 250% |
| 2 meters (5 feet) | 330% |

As shown in Table 1, the initial training data may be initial image content zoom values (%'s) determined in any suitable manner for an average human user that is viewing visual content of an image displayed on a display screen area 142 of the particular type of video display device 140 of information handling system 100, e.g., such as using data collected in a laboratory environment based on measured best eye ergonomics for an average human user (or for one or more test human users), and/or medically-suggested Zoom values (%) for best eye ergonomics for an average human user, etc. In the exemplary embodiment of Table 1, the initial image content zoom values (%'s) increase with increasing value of sensor-measured viewing distance (d), i.e., such that an initial image content zoom value (%) for a relatively larger value of sensor-measured viewing distance (d) is larger than an initial image content zoom value (%) for a relatively smaller value of sensor-measured viewing distance (d).

As is understood by those of skill in the art, a "zoom" value % represents the relative size of displayed visual content such that visual content that is displayed with a relatively smaller zoom value % is proportionally smaller in size (in both the X and Y axis directions) relative to the same visual content that is displayed with a relatively larger zoom value % (i.e., the same visual content that is displayed with a proportionally larger size). When deployed to information handling system 100 as described further below, the initial training data of Table 1 may be stored (e.g., as a lookup table) together with (or as a part of) software or firmware code of the image adjustment microservice 154 in non-volatile system storage 130 or NVM 190 of information handling system 100.

Next, in block 502, image adjustment microservice 154 from block 501 is deployed as software or firmware code to information handling system 100, where it is installed and stored, e.g., in non-volatile system storage 130 or NVM 190 of information handling system 100. In this regard, image adjustment microservice 154 may be, for example, published independently or included with an OS update received across network 163 from a remote server 166, and then installed on information handling system 100 by the human user of the information handling system 100. In another embodiment, image adjustment microservice 154 may form a part of the original software or firmware code that is initially provided with information handling system 100.

Next, in block 503, image adjustment microservice 154 is launched together on host OS 101, e.g., on startup or restart of information handling system 100. In one exemplary embodiment, launch of image adjustment microservice 154 may be automatically enabled post installation, in which case image adjustment microservice 154 may be disabled by human user 310 if desired. In another embodiment, image adjustment microservice 154 may be programmed not to launch post installation unless enabled by human user 310. In any case, once sensor driver 150 is launched and image adjustment microservice 154 is launched and up and running on OS 101, image adjustment microservice 154 establishes a connection with the camera 146 and the sensor 148 hardware components so that it may monitor the position of human user 310 and the distance (d) from where human user 310 views the image and its visual content (e.g., visual content 143, 145, and/or 147) displayed on display area 142 of video display device 140.

In block 504, a current user application 156 is opened on host OS 101 of information handling system 100. When current user application 156 is opened in block 504, host OS 101 reads and records the identity (ID) and/or type of current application 156 that is opened (e.g., such as word processing application, spreadsheet application, Internet browser application, photo editing application, code editing application, graphics application or other software application, etc.). In block 504, host OS 101 also captures and records the initial current size (e.g., zoom %) of the visual content (e.g., visual content 143, 145, and/or 147) of the image currently displayed by the current application 156 on display screen area 142 of the video display device 140. In block 504, host OS 101 may also capture and record the initial color scheme (e.g., initial color and/or color contrast) that is currently applied for the current visual content (e.g., visual content 143, 145, and/or 147), e.g., "day" or "night" color schemes as described further herein. The initial color contrast is the color contrast between the color of the visual content (e.g., visual content 143, 145, and/or 147) and the color of the background of the image that is displayed on display screen area 140 by the current application 156. Host OS 101 then passes the recorded initial values of current visual content size and current content color and/or color contrast to image adjustment microservice 154.

In block 506, image adjustment microservice 154 receives camera image data (e.g., including captured image of the face of the current human user 310) via camera API 152 from front facing camera 146, and receives sensor-measure viewing distance (d) data (e.g., including a value representing the current distance between the front surface 149 of display screen area 142 and the closest surface 308 of the front of the face of the current human user 310) via sensor driver 150 from distance sensor 148. Also in block 506, image adjustment microservice 154 and/or camera API 152 may identify or determine facial position of the current human user 310 from the image of the face of the current human user 310 received in the camera image data from front facing camera 146. In this regard, "facial position" refers to the current direction faced by the front of the face and eyes of current human user 310 relative to the outer (front) surface 149 of the display screen area 142 of video display device 140. In block 506, image adjustment microservice 154 may use this determined facial position to confirm that the face and eyes of the current human user 310 are facing the display screen area 142 of video display device 140 before accepting the sensor-measured viewing distance (d) measured in block 506 and proceeding with block flow 500. In one exemplary embodiment of block 506, when the surrounding ambient background light is dim enough that the camera 146 does not recognize user facial position, image adjustment microservice 154 may assume a predefined default viewing distance (d) (e.g., such as 50 centimeters, 60 centimeters, or other suitable greater or lesser predefined distance value) exists between the front surface 149 of the display screen area 142 and the surface 308 of the face of the current human user 310, and block flow 500 may proceed for the current iteration using this predefined default viewing distance (d) instead of actual sensor measured viewing distance (d).

Information regarding facial recognition technology and logic that may be employed by image adjustment microservice 154 and/or camera API 152 in the practice of one embodiment of the disclosed systems and methods for determining a human user's face position relative to display screen area 142 of video display device 140 may be found, for example, in U.S. Pat. No. 9,195,815, which is incorporated herein by reference in its entirety for all purposes. Information regarding eye tracking technology and logic that may be employed by image adjustment microservice 154 and/or camera API 152 in the practice of one embodiment of the disclosed systems and methods for tracking a human user's eyes and face position relative to display screen area 142 of video display device 140 may be found, for example, in United States U.S. Pat. No. 10,775,885 and in U.S. Pat. No. 10,937,425, each of which is incorporated herein by reference in its entirety for all purposes.

In optional block 508, image adjustment microservice 154 may additionally determine if the current time is day or night (e.g., from a clock/calendar logic that is executing as part of host OS 101) and, then depending on whether the current time is day or night, predict the current color scheme that defines the current visual content color and/or color contrast (i.e., contrast between the color of the visual content and the color of the background of the displayed image that is overlain by the visual content) that will be displayed on display screen area 140 by the current application 156 and OS 101, e.g., default relatively brighter color (e.g., red) and/or relatively higher color contrast value when current time is "day" and relatively dimmer or duller color (e.g., blue) and/or relatively lower color contrast value such as defined by "Windows Night Time Mode" when the current time is "night". In this embodiment, current application 156 and host OS 101 may be programmed and set by human user 310 to display visual content on display screen area 140 with a color and/or color contrast value that is most suitable for the human user 310 based on an assumed surrounding ambient light that corresponds to daylight lighting (e.g., bright sun) when the current time is determined to be day, or night time lighting (e.g., dim artificial lighting) when the current time is determined to be night.

As described further herein, in one exemplary embodiment visual content color and/or color contrast may be optionally taken into account by image adjustment microservice 154 since human user eye strain may also depend upon the color and/or color contrast of currently displayed visual content (e.g., text or other content) and background, e.g., relatively brighter content color (e.g., red) and relatively higher color contrast visual content may require a relatively lesser (i.e., smaller) zoom percentage value while a relatively dimmer content color (e.g., blue) and relatively lower color contrast visual content may require a relatively greater (i.e., larger) zoom percentage value. Thus, in one exemplary embodiment, the disclosed systems and methods may be implemented to automatically adjust the size of a given displayed visual content to a relatively lesser or smaller size (e.g., lesser or smaller zoom %) when the given visual content is displayed on a video display screen with a relatively brighter content color and/or relatively higher color contrast, and to automatically adjust the size of the same given displayed visual content to a relatively greater or larger size (e.g., greater or larger zoom %) when the same given visual content is displayed on the same display screen with a relatively dimmer content color and relatively lower color contrast.

Table 2 illustrates another hypothetical example embodiment of a predefined dataset of initial training data with which the AI-ML logic of image adjustment microservice 154 may be initially trained. In this embodiment, the predefined dataset of initial training data additionally includes predefined color-contrast adjusted zoom percentage values that include the same unchanged zoom % value as the predefined Initial Image Content Zoom Value (%) of Table 1 for use when the current time is "day", and an increased (i.e., larger) zoom % value that is a predefined 10% greater than the Initial Image Content Zoom Value (%) of Table 1 for use when the current time is "night", i.e., when the visual content is displayed by user application 156 and host OS 101 using a "night" color (e.g., blue) that is dimmer than the "day" color (e.g., red) that is used to display visual content when the current time is "day", and/or using a visual color contrast value that is relatively lower than the visual color contrast value used then the current time is "day". In the exemplary embodiment of Table 2, the adjusted initial image content zoom values (%'s) increase with increasing value of sensor-measured viewing distance (d), i.e., such that an adjusted initial image content zoom value (%) for a relatively larger value of sensor-measured viewing distance (d) is larger than an adjusted initial image content zoom value (%) for a relatively smaller value of sensor-measured viewing distance (d). As with Table 1, the number of viewing distances and the particular values displayed in Table 2 are exemplary only, and may vary as desired or needed to fit a given implementation.

TABLE 2

| Sensor-Measured Viewing Distance (d) | Initial Image Content Zoom Value (%) | Adjusted Initial Image Content Zoom Value (%) | |
|---|---|---|---|
| | | Current Time is "Day" | Current Time is "Night" |
| 0.3 meter (1 foot) | 50% | 50% | 55% |
| 0.4 meter (1.131 feet) | 66% | 66% | 73% |
| 0.5 meter (1.65 feet) | 83% | 83% | 91% |
| 0.6 meter 2 feet) | 100% | 100% | 110% |
| 1 meter (3.3 feet) | 165% | 165% | 182% |
| 1.5 meter (5 feet) | 250% | 250% | 275% |
| 2 meters (5 feet) | 330% | 330% | 363% |

It will be understood that the embodiment of Table 2 may be employed, for example, when the Initial Image Content Zoom Value (%) is predefined for daylight display lighting conditions. However, it will be understood that predefined color-contrast adjusted zoom percentage values may be defined in any other suitable manner, and may be determined using an adjustment factor that is greater or less than 10% greater for use when the current time is determined to be "night". Further, Initial Image Content Zoom Value percentages may be predefined for other than daylight display lighting conditions, and color-contrast adjusted zoom percentage values accordingly defined based on the display lighting conditions for which the Initial Image Content Zoom Value percentages were determined and predefined. It is also possible that predefined Initial Image Content Zoom Value percentages may be adjusted for either or both "day" and/or "night" current times, e.g., adjusted to a relatively lower zoom percentage than the corresponding Initial Image Content Zoom Value percentages when the current time is "day", and/or adjusted to a relatively higher zoom percentage than the corresponding Initial Image Content Zoom Value percentages when the current time is "night".

Still referring to block flow 500 of FIG. 5, in block 510 image adjustment microservice 154 next performs analysis of the data from the previous blocks of block flow 500. In this embodiment, analysis in block 510 performed by image adjustment microservice 154 includes block 512 in which image adjustment microservice 154 gathers or accesses current content display information obtained from host 101 in block 504, i.e., the initial current size (e.g., zoom %) of the current visual content (e.g., visual content 143, 145, and/or 147) of the image currently displayed by the current application 156, and the current color scheme (e.g., "day" or "night" color scheme) that is currently applied for the current visual content displayed by the current application 156. In block 514, image adjustment microservice 154 accesses the predefined dataset of initial training data (e.g., Table 1 or Table 2) from non-volatile storage 130 or NVM 190.

In block 516, image adjustment microservice 154 begins collecting data identifying any manual adjustments (e.g., zoom-in or zoom-out %) made by the human user 310 to the initial size (e.g., zoom %) of the visual content (e.g., visual content 143, 145, and/or 147) of the image currently displayed by the current application 156, together with the current sensor-measured viewing distance (d) to the front of the face of the human user 310 when these manual adjustments are made. These manual adjustments may be considered to reflect the preferred size (e.g., zoom %) of the visual content (e.g., visual content 143, 145, and/or 147) of the image currently displayed by the current application 156 that fits the particular eye sight or comfort of the current human user 310. In this regard, different individual human users may have different respective eye sight capabilities and qualities. Therefore, a current human user 310 may in some cases be more comfortable with a visual content size value (e.g., zoom %) that differs from the visual content size value (e.g., zoom %) of the predefined dataset of initial training data (e.g., such as Table 1 or Table 2).

Next in block 518, image adjustment microservice 154 analyzes the data of blocks 512, 514 and 516 to begin predicting automatic zoom-in or zoom-out adjustments (as the case may be) to be made to the initial current size (e.g., zoom %) of the current visual content (e.g., visual content 143, 145, and/or 147) in order to improve eye ergonomics of the current human user 310. In one embodiment, image adjustment microservice 154 may use AI-ML logic to consider the human user's adjustments of block 516 together with the predefined initial content size (e.g., zoom value) of the training dataset of block 514, and then may optionally further predict the automatic zoom-in or zoom-out adjustments of block 518 by taking into account the current initial color and/or color contrast that is currently applied for the current visual content displayed by the current application 156. Table 3 illustrates a hypothetical example embodiment of the results of block 518.

TABLE 3

| | | Current Cumulative | Current Predicted | |
|---|---|---|---|---|
| | | Current Cumulative | Current Predicted Adjusted | |
| | Initial Image | Average of User- | Image Content Zoom Value (%) | |
| Sensor-Measured Viewing Distance (d) | Content Zoom Value (%) | Selected Content Zoom Value (%) | Current Time is "Day" | Current Time is "Night" |
| 0.3 meter (1 foot) | 50% | 55% | 52.5% | 57.8% |
| 0.4 meter (1.131 feet) | 66% | 73% | 69.5% | 76.5% |
| 0.5 meter (1.65 feet) | 83% | 91% | 87% | 95.7% |
| 0.6 meter 2 feet) | 100% | 110% | 105% | 110% |
| 1 meter (3.3 feet) | 165% | 182% | 173.5% | 190.9% |
| 1.5 meter (5 feet) | 250% | 275% | 262.5% | 288.8% |
| 2 meters (5 feet) | 330% | 363% | 346.5% | 381.2% |

As shown in the exemplary embodiment of Table 3, AI-ML logic of image adjustment microservice 154 maintains and updates a current cumulative average value of user-selected content size (e.g., zoom %) values that are manually selected over time by the current human user 310, e.g., that represent human user-selected changes to the current content size (e.g., zoom %) values of the current visual content (e.g., visual content 143, 145, and/or 147) of the image currently displayed by the current application 156 at respective different given sensor-measured viewing distances (d). This cumulative average value of user-selected content size (e.g., zoom %) values is updated by averaging in a new user-selected content size value for a given sensor-measured viewing distance (d) each time the current human user 310 manually selects a new user-selected content size value for the current visual content of the image at that given sensor-measured viewing distance (d), i.e., by adding the new user-selected content size value to the running cumulative average for the given sensor-measured viewing distance (d). This cumulative average value of user-selected content size (e.g., zoom %) values may be saved and stored (e.g., in non-volatile system storage 130 or system NVM 190) for a given user application 156 after it has been closed and/or the system has been turned OFF or rebooted so that the latest updated cumulative average value of user-selected content size (e.g., zoom %) values may be re-accessed and used by image adjustment microservice 154 any time the given user application 156 is reopened in the future. In one embodiment, a different respective dataset of cumulative average value of user-selected content size (e.g., zoom %) values (e.g., with a dataset similar to Table 3) may be generated, updated and stored in non-volatile storage or memory for each different given user application 156, and then retrieved from storage or memory and used by image adjustment microservice 154 anytime that same corresponding given user application 156 is launched and running.

As further shown in the exemplary embodiment of Table 3, for each sensor-measured viewing distance (d), AI-ML logic of image adjustment microservice 154 may also then average the current cumulative average value of user-selected content size (e.g., zoom %) with the initial image content zoom value (%) of the training dataset for the same given sensor-measured viewing distance (d). This is illustrated in the exemplary embodiment of Table 3 where the current predicted adjusted image content zoom values (%) for "day" viewing are equal to the average of the current cumulative average value of user-selected content size (e.g., zoom %) and the initial image content zoom value (%) of the training dataset for each sensor-measured viewing distance (d) value. However, the current predicted adjusted image content zoom values (%) for "night" viewing are calculated by increasing the current predicted adjusted image content zoom values (%) for "day" viewing by a predefined value of 10% for each sensor-measured viewing distance (d) value. In the exemplary embodiment of Table 3, the current predicted adjusted image content zoom values (%'s) increase with increasing value of sensor-measured viewing distance (d), i.e., such that a current predicted adjusted image content zoom value (%) for a relatively larger value of sensor-measured viewing distance (d) is larger than a current predicted adjusted image content zoom value (%) for a relatively smaller value of sensor-measured viewing distance (d).

Still referring to block flow 500, in block 520 image adjustment microservice 154 selects the current predicted adjusted image content zoom value (%) corresponding to the current sensor-measured viewing distance (d) of the current iteration, and sends an alert command to host OS 101 to instruct host OS 101 to reset or adjust the visual content size (e.g., zoom %) of the currently displayed image on display screen area 140 to this selected current predicted adjusted image content zoom value (%) for the current iteration of block flow 500. This alert command may also contain the current predicted adjusted image content zoom value (%) selected from Table 3 for the current iteration of block flow 500.

In the exemplary embodiment of Table 3, the selected current predicted adjusted image content zoom value (%) for a given iteration of block 520 of block flow 500 will depend on the determined current display color scheme (e.g., either "day" or "night" color scheme in this embodiment). Thus, referring to Table 3, the selected current predicted adjusted image content zoom value (%) for a given iteration of block flow 500 will be either: 1) the current predicted adjusted image content zoom value (%) for the current sensor-measured viewing distance (d) corresponding to the "day" viewing content color scheme (i.e., when the viewing time has been determined or set to be "day"), or to be 2) the selected current predicted adjusted image content zoom value (%) for the current sensor-measured viewing distance (d) corresponding to "night" viewing content color scheme (i.e., when the viewing time has been determined or set to be "night").

As an example, for the hypothetical dataset of Table 3 (which represents the dataset of the current iteration of block flow 500), a current predicted adjusted image content zoom value of 87% will be selected from Table 3 when the current sensor-measured viewing distance (d) of the current human user 310 is determined for the current iteration to be 0.5 meters (or 1.65 feet) and the current color scheme corresponding to "day" is currently being used in the current iteration of block flow 500 to display visual content on display screen area 140. On the other hand, a current predicted adjusted image content zoom value of 95.7% will be selected from Table 3 when the current sensor-measured viewing distance (d) of the current human user 310 is determined for the current iteration to be 0.5 meters (or 1.65 feet) and the current color scheme corresponding to "night" is currently being used in the current iteration of block flow 500 to display visual content on display screen area 140.

Next, in block 522, host OS 101 responds to the alert command received in block 520 by automatically resetting or adjusting the content size (e.g., zoom %) currently displayed on display screen area 140 (i.e., without human user intervention) to be the current predicted adjusted image content zoom value (%) that was sent in block 520 by image adjustment microservice 154 to host OS 101, and thus correcting strained vision of the current human user 310 as well as improving the eye ergonomics of the current human user 310.

If the human user 310 is comfortable and happy with the auto-adjusted size of the current visual content (e.g., visual content 143, 145, and/or 147) displayed in block 522 on display screen area 142 of video display device 140, then the human user 310 may leave the current size of the displayed current visual content unchanged in block 524. Block flow 500 then returns from block 524 to block 504 and iteratively repeats as shown. In one embodiment, block flow 500 may iteratively repeat from block 504 to block 504 once per second, although iterations of greater or lesser than once per second are possible in other embodiments.

It will be understood that the AI-ML logic of image adjustment microservice 154 may initially begin by using only the predefined training dataset (e.g., such as Table 1 or Table 2) during the first iteration of block flow 500 for a new given user application 156 that itself has been launched for the first time. However, with successive iterations of block flow 500, AI-ML logic of image adjustment microservice 154 captures human user-selected changes to the current content size (e.g., zoom %) values of the current visual content (e.g., visual content 143, 145, and/or 147) of the image currently displayed by the current application 156 at respective different given sensor-measured viewing distances (d), and continues to update and store the current cumulative average value of user-selected content size (e.g., zoom %) values for the given user application 156 as previously described as long as the given user application 156 is running. Thus, block flow 500 may be a continuous process which helps to make operation of image adjustment microservice 154 more user friendly.

If, in block 524, the human user 310 is not comfortable with the auto-adjusted size of the current visual content (e.g., visual content 143, 145, and/or 147) displayed in block 522 on display screen area 142 of video display device 140, then the human user 310 may manually change or adjust (e.g., correct) the size of the displayed current visual content of the given current application 156 in block 524 (e.g., by manually zooming-in or zooming-out the content size on display screen area 142). If the human user manually changes or adjusts the displayed content size (e.g., zoom %) for the given current application 156 in block 524, then the new user-selected content size is implemented and retained in block 526 only for the given current application 156, and remains in effect for the duration of the current session of the given current user application 156, e.g., until the human user 310 closes the current application 156 in block 528. The next time that the given current application 156 is freshly opened by the human user 310, then block flow 500 starts again at block 504 and proceeds as previously described to consider the predefined dataset of initial training data together with the user-selected content size (e.g., zoom %) values that are manually selected over time by the current human user 310. This feature of blocks 524 and 526 may be implemented, for example, to provide a different human user 310 the ability to implement different preferred screen content sizes best for their unique eyesight, the environment in which they are using the video display device 140, and/or the current time (day or night).

Also in block 526, the new user-selected content size (e.g., zoom %) of block 524 is pushed to the AI-ML logic model as new user-selected content size data associated with the user's current sensor-measured viewing distance, and the AI-ML logic of image adjustment microservice 154 then updates the current cumulative average value of user-selected content size (e.g., zoom % values of Table 3) by averaging in this new user-selected content size value for a given sensor-measured viewing distance (d). Thus, the next time that human user 310 opens given current application 156, AI-ML logic of image adjustment microservice 154 will analyze the user's preferred data (e.g., current cumulative average value of user-selected content size) together with the predefined dataset of initial training data to predict the adjusted image content size (e.g., zoom % value) for the current visual content (e.g., visual content 143, 145, and/or 147) displayed by the given current user application 156 in the manner as previously described.

It will be understood that the identity and sequence of blocks of block flow 500 of FIG. 5 shown and described herein are exemplary only, and that any combination of fewer, additional and/or alternative blocks may be employed that are suitable for automatically and dynamically analyzing displayed image characteristics of a video display screen, and automatically and dynamically altering the image characteristics displayed by the video display screen to correct or improve the eye ergonomics of a current human user.

It will also be understood that one or more of the tasks, functions, or methodologies described herein (e.g., including those described herein for components 101, 102, 110, 120, 125, 126, 130, 140, 150, 152, 154, 156, 160, 163, 166, 170, 171, 175, 180, 190, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more blocks of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising executing logic on at least one programmable integrated circuit of an information handling system to perform the following:

determining a current viewing distance between a closest surface of a face of a current human user and the display screen area of the video display device, the closest surface of the face of the current human user being the surface of the face of the human user that is closest to the display screen area of the video display device; and then adjusting a displayed image characteristic of an image displayed on the display screen area based on the determined current viewing distance between the closest surface of the face of the current human user and the display screen area.

2. The method of claim 1, where the displayed image characteristic of the image displayed on the display screen area comprises a size of displayed visual content; and where the adjusting the displayed image characteristic of the image displayed on the display screen area comprises adjusting the size of the displayed visual content on the display screen area.

3. The method of claim 2, further comprising, after performing the adjusting the size of the displayed visual content on the display screen area, then executing the logic on the at least one programmable integrated circuit of the information handling system to perform the following:
receiving an input from a human user that comprises a user-selected image size value that is different from an adjusted image size value that corresponds to the adjusted size of the displayed visual content on the display screen area; and
then changing the size of the displayed visual content on the display screen area from the adjusted image size value to the user-selected image size value.

4. The method of claim 2, further comprising executing the logic on the at least one programmable integrated circuit of the information handling system to perform the adjusting the displayed image characteristic by automatically adjusting the size of the displayed visual content based on a predefined image size value corresponding to the determined current viewing distance between the closest surface of the face of the current human user and the display screen area.

5. The method of claim 2, further comprising executing the logic on the at least one programmable integrated circuit of the information handling system to perform the adjusting the displayed image characteristic by:
determining at least one user-selected previous image size value of previously displayed visual content that has been previously selected by a human user of the information handling system at a previous viewing distance that corresponds to the determined current viewing distance between the closest surface of the face of the current human user and the display screen area;
then determining an adjusted image size value based on the determined at least one previous image size value and a predefined image size value corresponding to the determined current viewing distance between the closest surface of the face of the current human user and the display screen area; and
then adjusting the displayed image characteristic of the image displayed on the display screen area by automatically adjusting the size of the displayed visual content based on the determined adjusted image size value and the determined current viewing distance between the closest surface of the face of the current human user and the display screen area.

6. The method of claim 5, where the at least one user-selected previous image size value of previously displayed visual content comprises multiple user-selected previous image size values of the previously displayed visual content; and where the method further comprise executing the logic on the at least one programmable integrated circuit of the information handling system to perform the following:
iteratively receiving multiple inputs from a human user that each comprise one of the multiple user-selected previous image size values of visual content displayed on the display screen area at multiple different viewing distances between the closest surface of the face of the current human user and the display screen area;
iteratively determining each of the multiple user-selected previous image size values of the previously displayed visual content that has been previously selected by a human user of the information handling system at each of the multiple different viewing distances, including at the previous viewing distance that corresponds to the determined current viewing distance between the closest surface of the face of the current human user and the display screen area; and
then determining the adjusted image size value based on the determined multiple previous image size values and the predefined image size value corresponding to the determined current viewing distance between the closest surface of the face of the current human user and the display screen area.

7. The method of claim 2, where the adjusted image size value is an image content zoom value.

8. The method of claim 2, further comprising executing the logic on the at least one programmable integrated circuit of the information handling system to perform the adjusting the displayed image characteristic by:
determining a current time of day;
determining a current color scheme of the image displayed on the display screen based on the determined time of day;
displaying the image on the display screen area with the determined current color scheme; and
adjusting the displayed image characteristics of the image displayed on the display screen area by automatically adjusting the size of the displayed visual content based on the determined current color scheme and the determined current viewing distance between the current human user and the display screen area to provide an adjusted image size of the displayed content that depends in part on the determined current color scheme.

9. The method of claim 2, further comprising executing the logic on the at least one programmable integrated circuit of the information handling system to perform the adjusting the displayed image characteristic by:
determining a current color scheme of the image displayed on the display screen, the determined current color scheme comprising at least one of a color or a color contrast used to display the image on the display screen area; and
adjusting the displayed image characteristics of the image displayed on the display screen area by automatically adjusting the size of the displayed visual content based on the determined current color scheme and the determined current viewing distance between the current human user and the display screen area to provide an adjusted image size of the displayed content that depends in part on the determined current color scheme.

10. The method of claim 1, further comprising executing the logic on the at least one programmable integrated circuit to;
first determine a facial position of the current human user relative to the display screen area of the video display device;
then confirm from the determined facial position of the current user that the face and eyes of the current human user are facing the display screen area of the video display device; and
then perform the following only if the face and eyes of the current human user are confirmed to be facing the display screen area of the video display device:
accept the determined current viewing distance between the closest surface of the face of the current human user and the display screen area, and
perform the adjusting the displayed image characteristic of the image displayed on the display screen area based on the accepted determined current viewing distance between the closest surface of the face of the current human user and the display screen area.

11. An information handling system, comprising:
a video display device;
a distance sensor; and
at least one programmable integrated circuit coupled to the video display device and the distance sensor;
where the at least one programmable integrated circuit is programmed to provide image display data signals to the video display device to display an image to a human user on a display screen area of a video display device, and where the at least one programmable integrated circuit being further programmed to:
determine a current viewing distance between a closest surface of a face of the current human user and the display screen area of the video display device from viewing distance data received from the distance sensor, the closest surface of the face of the current human user being the surface of the face of the human user that is closest to the display screen area of the video display device, and
then to provide the image display data signals to the video display device to adjust a displayed image characteristic of the image displayed on the display screen area based on the determined current viewing distance between the closest surface of the face of the current human user and the display screen area.

12. The information handling system of claim 11, where the displayed image characteristic of the image displayed on the display screen area comprises a size of displayed visual content; and where the at least one programmable integrated circuit is programmed to provide the image display data signals to the video display device to adjust the displayed image characteristic of the image displayed on the display screen area by adjusting the size of the displayed visual content on the display screen area.

13. The information handling system of claim 12, further comprising one or more input/output (I/O) devices coupled to the at least one programmable integrated circuit; and where, after providing the image display data signals to the video display device to adjust the size of the displayed visual content on the display screen area, the at least one programmable integrated circuit is programmed to then:
receive an input from a human user as user input data from the I/O devices that comprises a user-selected image size value that is different from an adjusted image size value that corresponds to the adjusted size of the displayed visual content on the display screen area; and
then provide the image display data signals to the video display device to change the size of the displayed visual content on the display screen area from the adjusted image size value to the user-selected image size value.

14. The information handling system of claim 12, further comprising non-volatile storage or non-volatile memory that is coupled to the at least one programmable integrated circuit; and where the at least one programmable integrated circuit is programmed to:
retrieve, from the non-volatile storage or non-volatile memory, data comprising a predefined image size value corresponding to the determined current viewing distance between the closest surface of the face of the current human user and the display screen area; and
provide the image display data signals to the video display device to adjust the displayed image characteristic by automatically adjusting the size of the displayed visual content based on the retrieved predefined image size value.

15. The information handling system of claim 12, further comprising non-volatile storage or non-volatile memory that is coupled to the at least one programmable integrated circuit; and where the at least one programmable integrated circuit is programmed to adjust the displayed image characteristic of the image displayed on the display screen area by:
retrieving, from the non-volatile storage or non-volatile memory, data comprising a an adjusted image size value that is based on:
at least one user-selected previous image size value of previously displayed visual content that has been previously selected by a human user of the information handling system at a previous viewing distance that corresponds to the determined current viewing distance between the closest surface of the face of the current human user and the display screen area, and
a predefined image size value corresponding to the determined current viewing distance between the closest surface of the face of the current human user and the display screen area; and
then providing the image display data signals to the video display device to adjust the displayed image characteristic of the image displayed on the display screen area by automatically adjusting the size of the displayed visual content based on the retrieved adjusted image size value and the determined current viewing distance between the closest surface of the face of the current human user and the display screen area.

16. The information handling system of claim 15, where the at least one user-selected previous image size value of previously displayed visual content comprises multiple user-selected previous image size values of the previously displayed visual content; where the system further comprises one or more input/output (I/O) devices and non-volatile storage or non-volatile memory coupled to the at least one programmable integrated circuit; and where the at least one programmable integrated circuit is programmed to:
iteratively receive multiple user inputs from a human user as user input data from the I/O devices, each of the multiple user inputs comprising a user-selected image size value of visual content displayed on the display screen area at multiple different viewing distances between the closest surface of the face of the current human user and the display screen area;
iteratively determine each of the multiple user-selected previous image size values of the previously displayed visual content that has been previously selected by a human user of the information handling system at each of the multiple different viewing distances, including at the previous viewing distance that corresponds to the determined current viewing distance between the closest surface of the face of the current human user and the display screen area; and
providing data to the non-volatile storage or non-volatile memory to store the iteratively-determined user-selected previous image size value of the previously displayed visual content that has been previously selected by a human user of the information handling system at each of the multiple different viewing distances.

17. The information handling system of claim 12, where the adjusted image size value is an image content zoom value.

18. The information handling system of claim 12, where the at least one programmable integrated circuit is programmed to adjust the displayed image characteristic of the image displayed on the display screen area by:
   determining a current time of day;
   determining a current color scheme of the image displayed on the display screen based on the determined time of day;
   displaying the image on the display screen area with the determined current color scheme; and
   providing the image display data signals to the video display device to adjust the displayed image characteristics of the image displayed on the display screen area by automatically adjusting the size of the displayed visual content based on the determined current color scheme and the determined current viewing distance between the current human user and the display screen area to provide an adjusted image size of the displayed content that depends in part on the determined current color scheme.

19. The information handling system of claim 12, where the at least one programmable integrated circuit is programmed to adjust the displayed image characteristic of the image displayed on the display screen area by:
   determining a current color scheme of the image displayed on the display screen, the determined current color scheme comprising at least one of a color or a color contrast used to display the image on the display screen area; and
   providing the image display data signals to the video display device to adjust the displayed image characteristics of the image displayed on the display screen area by automatically adjusting the size of the displayed visual content based on the determined current color scheme and the determined current viewing distance between the current human user and the display screen area to provide an adjusted image size of the displayed content that depends in part on the determined current color scheme.

20. The information handling system of claim 11, further comprising a camera coupled to the at least one programmable integrated circuit; and where the at least one programmable integrated circuit is programmed to:
   first determine, from camera image data received from the camera, a facial position of the current human user relative to the display screen area of the video display device;
   then confirm from the determined facial position of the current user that the face and eyes of the current human user are facing the display screen area of the video display device; and
   then perform the following only if the face and eyes of the current human user are confirmed to be facing the display screen area of the video display device:
      accept the determined current viewing distance between the closest surface of the face of the current human user and the display screen area, and
      perform the providing of the image display data signals to the video display device to adjust the displayed image characteristic of the image displayed on the display screen area based on the accepted determined current viewing distance between the closest surface of the face of the current human user and the display screen area.

* * * * *